Figure 1:
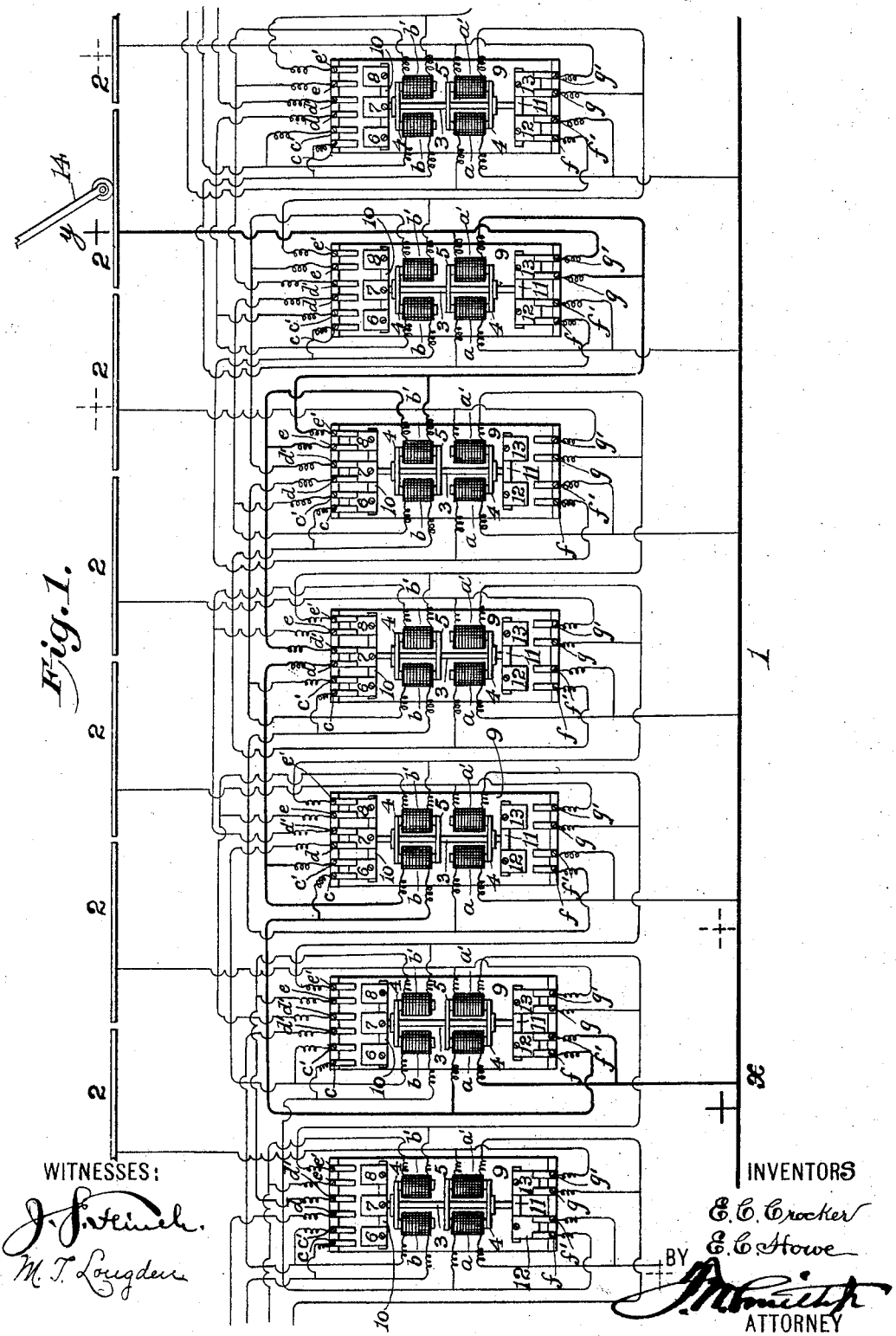

(No Model.) 2 Sheets—Sheet 1.

E. C. CROCKER & E. C. HOWE.
ELECTRIC RAILWAY.

No. 603,625. Patented May 10, 1898.

WITNESSES:
INVENTORS
E. C. Crocker
E. C. Howe
BY
ATTORNEY (No Model.) 2 Sheets—Sheet 2.

E. C. CROCKER & E. C. HOWE
ELECTRIC RAILWAY.

No. 603,625. Patented May 10, 1898.

WITNESSES:

INVENTORS
E. C. Crocker
E. C. Howe
BY
ATTORNEY

UNITED STATES PATENT OFFICE.

EBEN C. CROCKER AND EDWIN C. HOWE, OF BRIDGEPORT, CONNECTICUT.

ELECTRIC RAILWAY.

SPECIFICATION forming part of Letters Patent No. 603,625, dated May 10, 1898.

Application filed September 17, 1897. Serial No. 652,045. (No model.)

*To all whom it may concern:*

Be it known that we, EBEN C. CROCKER and EDWIN C. HOWE, citizens of the United States, residing at Bridgeport, in the county of Fairfield and State of Connecticut, have invented certain new and useful Improvements in Electric Railways; and we do hereby declare the following to be a full, clear, and exact description of the invention, such as will enable others skilled in the art to which it appertains to make and use the same.

Our invention relates to electric railways, and has for its especial object to improve upon the construction shown and described in the pending application filed by Eben C. Crocker April 23, 1897, under Serial No. 633,499. In this pending application a construction was shown and described which comprised two series of double-wound magnets arranged in horizontally-disposed couplets, the magnets of one series being connected in quarternate pairs in circuit with pairs of alternate magnets of the other series, and connections with the supply-conductor and the insulated rail-sections through intermediate circuit closers and breakers operated by the magnets, whereby the sections having contact with the collector are in closed circuit, while the sections immediately succeeding and preceding were in circuits capable of being closed by the collector as soon as the latter had come in contact therewith. While this system described in said pending application has been quite successful in its operation, nevertheless the double-wound magnets are deemed to be unreliable in that the insulation on the coils may possibly wear off, thus destroying the independent relation which should exist between the coils of the double windings. The fact is of course recognized that a magnet having two distinct windings is the electrical equivalent of two magnets provided with separate windings; but it now appears that so much stress was in said pending application laid upon double-wound magnets that it might be inferred that the applicant was not aware of the fact that two separate-wound magnets were the equivalent of the single double-wound magnet, and therefore the present application is made with the end in view to show and describe a practical system which shall do away with the double-wound magnets and which shall, furthermore, set forth a progressive system of wiring and connections between the supply-conductor and the insulated third-rail sections.

A further object of the present invention is to provide automatically-operated shunt devices whereby the electric current may be shunted from the magnets as soon as the latter have performed their function of operating the switches, so that said current may be transmitted in practically a direct line from the supply-conductor to the rail-sections without any intermediate resistance, such as the magnet-coils.

In the present invention two series of magnets are employed, each series composed of pairs of separate magnets arranged opposite to the corresponding pairs of magnets in the other series, and the magnets of one series are connected in quarternate pairs in circuit with pairs of alternate magnets of the other series, so as to form separate branch circuits, and there are breaks in each circuit, and said circuits are opened and closed by switches which are operated by these magnets; but it will be observed by reference to the former pending application that after connecting the first magnet of a quarternate pair of one series with the immediately succeeding alternate magnet of the other series the connection was then made with the second quarternate magnet and thence back to the second alternate magnet, which manner of connecting up the magnets used up considerable wire. In the present improvement the first magnet of the quarternate pair of one series is connected successively with the two alternate magnets of the other series and finally with the second quarternate magnet, thus affording a progressive connection between the supply-conductor and the several insulated sections, and this of course means less resistance throughout the system.

Figure 2:
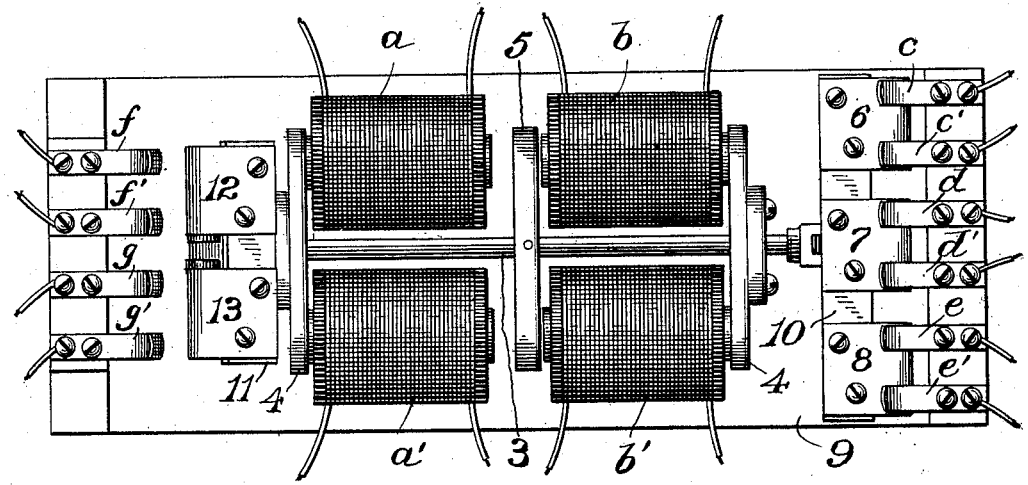
Figure 3:
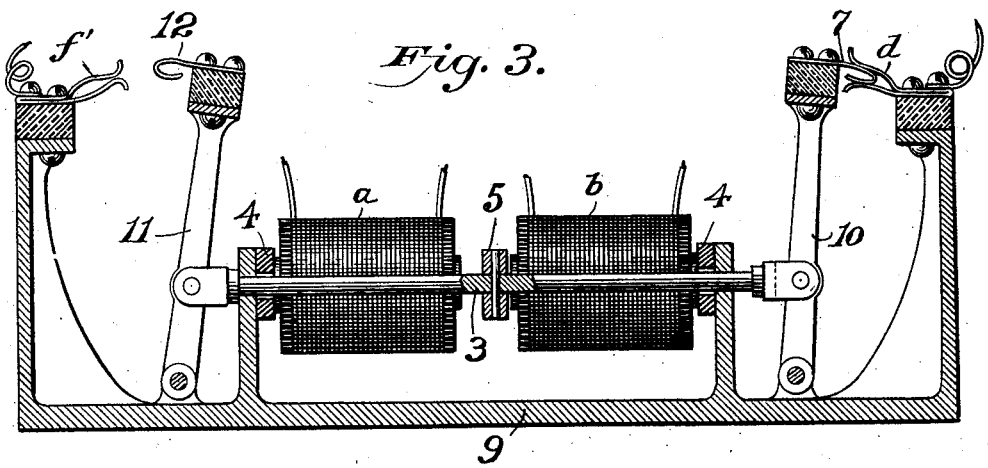

Referring to the accompanying drawings, which form a part of this application, Figure 1 is a plan view of our improvement, the sectional conductor and the supply-conductor being shown on opposite sides of the magnets for the purpose of a better understanding of our invention, although in practice they would occupy locations respectively above and below such magnets; Fig. 2, a detail enlarged plan of two pairs of oppositely-arranged magnets in each series and showing particularly the construction and arrangement of the armature and switches whereby the branch circuits are closed and opened and the shunt device operated, and Fig. 3 a sectional elevation of the construction shown at Fig. 2.

Similar numbers and letters of reference denote like parts in the several figures of the drawings.

1 is the supply-conductor, and 2 are the insulated third-rail sections.

One series of magnets is composed of pairs of magnets denoted by the letters $a\ a'$, while the other series of magnets is composed of pairs of magnets denoted by the letters $b\ b'$, these pairs being arranged opposite each other throughout the series.

3 are rods supported in any suitable manner so as to be capable of free longitudinal sliding movements, in the present instance these rods being supported within the yokes 4, which hold the magnets. 5 are armatures secured to these rods within the magnetic fields of opposite pairs of magnets in each series, so that said armatures may be attracted by the magnets $a\ a'$ or the magnets $b\ b'$. 6 7 8 are three insulated switches carried at one extremity of each of these rods 3, and $c\ c'$, $d\ d'$, and $e\ e'$ are three pairs of insulated contacts supported on the boxes 9, which house the magnets.

The switches 6 7 8 are mounted on top of levers 10, pivoted to the boxes 9, and the rods 3 are loosely connected to these levers, so that it will be clear that the longitudinal movements of these rods will cause the levers to swing back and forth, whereby the switches are engaged with or disengaged from the contacts $c\ c'$, $d\ d'$, and $e\ e'$ for the purpose presently explained. The other extremities of these rods are loosely connected with levers 11, pivoted to the boxes 9, which levers carry at their upper ends insulated switches 12 13, which are engaged with and disengaged from the insulated contacts $f\ f'$ and $g\ g'$, supported by said boxes, when the rods are moved to and fro longitudinally for the purpose presently explained.

The magnets $a\ a'$ are connected up in pairs composed of single magnets selected from each quarternate couplet, with pairs of the other series of magnets composed of single magnets of each alternate couplet intervening between the quarternate couplets of the first-mentioned series, so as to form various branch circuits along the line, each circuit comprising four single magnets. For instance, referring to Fig. 1 of the drawings and counting near the left of the illustration, the first magnet (lettered $a$) is connected with the second magnet, (lettered $b$,) the circuit then continuing and taking in successively the fourth magnet $b'$ and the fifth magnet $a'$, this circuit being broken at the contact-points $d\ d'$, so that it will be clear that single magnets selected from quarternate pairs of one series are connected up in circuit with single magnets selected from intervening alternate couplets of the other series. The terminals of these circuits have connection, respectively, with the supply-conductor 1 and the insulated sections 2, and it will be clear that all the wiring in the various branch circuits is progressive, starting from the supply-conductor and ending with these insulated sections.

14 is the power-collector, which is of any ordinary construction and is carried by the car, and it will be observed that the insulated section on which this collector rests is in a closed circuit, the power being taken at the point $x$ from the supply-conductor and communicated at the point $y$ to this section. It will also be clear that the three middle armatures 5 in the illustration of Fig. 1 have been attracted by the series $b\ b'$ of the magnets, so that the switches operated by these armatures have closed the circuits at the three sets of contact-points $c\ c'$, $d\ d'$, and $e\ e'$, the middle one of these armatures having been operated to complete the circuit which is closed by the power-collector, while the two outer armatures have operated to complete the circuits which include, respectively, the insulated sections immediately succeeding and preceding the section on which this power-collector rests. It will therefore be clear that a car may be run in either direction, since the branch circuits on either side of the circuit closed by the power-collector will be closed the moment such collector comes in contact with them.

Referring again to Fig. 1 and taking, for example, the branch circuit from the point $x$ to the point $y$, the first magnet $a$ which is energized (the second magnet $a$ from the left of the illustration) will attract the armature 5 and effect the breaking of the branch circuit between the supply-conductor and the fourth sectional conductor 2, while the energizing of the alternate magnets $b\ b'$ in the other series of magnets will attract the armatures and effect the completion of the branch circuits, which include the fifth and seventh sectional conductors 2, respectively. Neither of the magnets $b\ b'$ intermediate of these alternate pairs of magnets $b\ b'$ will be energized, since these magnets are not now in closed circuit; but the armature will remain against these magnets in the position shown in the drawings until it is withdrawn by the action of the opposing pair of magnets.

From the foregoing description it will be clear that the various branch circuits include one pair of quarternate magnets of one series and a pair of intervening alternate magnets of the other series and that $d\ d'$ are the points at which these circuits are opened and closed by the action of the switches carried by the armature-rods.

In an electric-railway system like that heretofore described the magnet-coils not only afford great resistance to the current used, but also these coils are liable to become burned out by the current, since the wires composing the coils are necessarily quite small. In view of these facts and for the reason that the sole function performed by the magnets is the operation of the armatures to control the switches in making and breaking the various circuits we have provided automatically-operated shunt devices whereby the current is deflected from the magnets as soon as the latter have performed their function and is directed in practically a straight line between the supply-conductor and the insulated sections. We have illustrated a preferred style of shunt device, which we have heretofore described; but we do not wish to be limited to any construction of such device, since any ordinary switch or shunt will answer the purposes of our invention in this respect. The contacts $c$ $c'$ and $e$ $e'$ are tapped into connection with the coil-wires of the magnets $b$ $b'$, so that as soon as the switches 6 and 8 are engaged with these contacts, after the armatures have performed their function, the current instead of passing through the coils of the magnets will seek the shortest route and will pass through the shunting-wires. Likewise the contacts $f$ $f'$ and $g$ $g'$ and the switches 12 13 are provided, the contacts being tapped in connection with the coils of the magnets $a$ $a'$, so that as soon as these magnets have performed their function the current will be shunted from their coils. These shunt devices are preferably located near each couplet of the series of magnets throughout the various branch circuits; but of course if it is not deemed necessary to cut out all the magnets fewer shunts may be employed, and we therefore do not wish to be limited in this respect, the gist of our invention in this respect resting in the broad idea of providing shunt devices automatically operated by the armatures for cutting out the magnet-coils as soon as the latter have performed their function and conducting the current in practically a direct line between the supply-conductor and the several insulated sections.

Having thus described our invention, what we claim as new, and desire to secure by Letters Patent, is—

1. In an electric-railway system which comprises a supply-conductor, insulated third-rail sections, and a power-collector carried by the car, the two series of magnets each series comprising pairs of separate magnets arranged opposite each other, single magnets selected from each quarternate couplet of one series being connected in circuit with single magnets selected from alternate couplets of the other series intervening between said quarternate couplets, whereby branch circuits are formed, and connections with said conductor and sections through intermediate circuit closers and breakers operated by said magnets whereby the section having contact with the collector is in closed circuit while the sections immediately succeeding and preceding are in circuits capable of being closed by the collector, substantially as set forth.

2. In an electric-railway system which comprises a supply-conductor, insulated third-rail sections, and a power-collector carried by the car, the two series of magnets each series comprising pairs of separate magnets arranged opposite each other, single magnets selected from each quarternate couplet of one series being connected in circuit with single magnets selected from alternate couplets, whereby branch circuits are formed, connections with said conductor and sections through intermediate circuit closers and breakers operated by said magnets whereby the section having contact with the collector is in closed circuit while the sections immediately succeeding and preceding are in circuits capable of being closed by the collector, and shunt devices tapped into connection with the coils of said magnets and automatically operated by said circuit closers and breakers whereby the current is shunted from said magnets after the latter have performed their function and is directed in practically a straight course between the supply-conductor and the various insulated sections, substantially as set forth.

In testimony whereof we affix our signatures in presence of two witnesses.

EBEN C. CROCKER.
EDWIN C. HOWE.

Witnesses:
F. W. SMITH, Jr.,
M. T. LONGDEN.